United States Patent [19]
Maier et al.

[11] 3,924,160
[45] Dec. 2, 1975

[54] CIRCUIT BREAKER WITH DETACHABLY CONNECTED FAULT SIMULATOR

[75] Inventors: Alfred E. Maier, Beaver Falls; Alan B. Shimp, Monroeville, both of Pa.

[73] Assignee: Westinghouse Electric Corporation, Pittsburgh, Pa.

[22] Filed: July 25, 1974

[21] Appl. No.: 491,728

Related U.S. Application Data
[62] Division of Ser. No. 401,932, Sept. 28, 1973.

[52] U.S. Cl. .......................... 317/36 TD; 324/28 CB
[51] Int. Cl.² .......................................... G01R 31/02
[58] Field of Search... 317/36 TD; 324/28 R, 28 CB

[56] References Cited
UNITED STATES PATENTS
3,697,810  10/1972  Wilson et al. .................. 317/36 TD Primary Examiner—James D. Trammell
Attorney, Agent, or Firm—M. J. Moran

[57] ABSTRACT

A relatively small, electrical device which provides voltage signals on two output lines thereof. The output lines are adapted to be connected by way of a suitable plug to a set of special input terminals on a molded case circuit breaker. The simulator is energized by standard 120 volt, 60 hz. power. The signals from the output terminals of the simulator are provided to the static trip circuit of the circuit breaker. The input connections are so arranged as not to interfere with the overload sensing devices of the circuit breaker being tested. Consequently, the circuit breaker need not be disconnected while testing. By moving a selector switch, either a high level or low level signal may be applied from the simulator to the static trip circuit. The high level signal corresponds to an overload condition which would normally cause an instantaneous trip of the circuit breaker. This signal is timed or limited to be removed from the input of the trip circuit after a short period of time. This prevents the trip circuit from being damaged by the signal. A low level signal may be applied which simulates that kind of overload condition which would normally cause the circuit breaker to trip after a predetermined delay.

9 Claims, 4 Drawing Figures

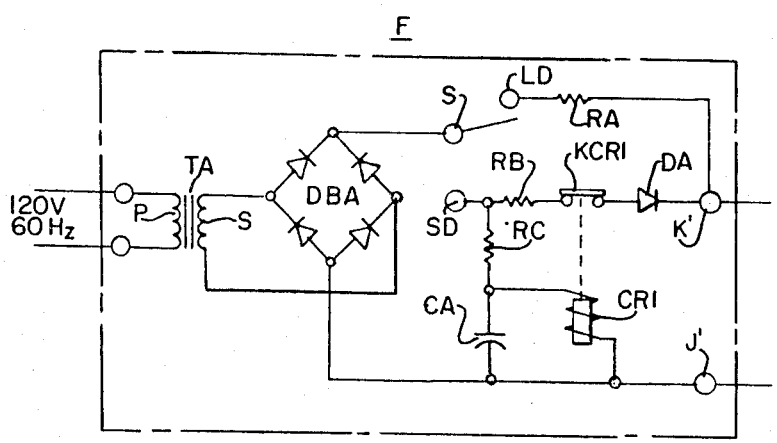
FIG.2
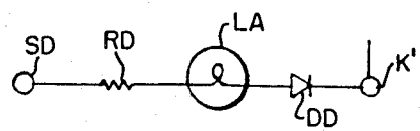
FIG.3
FIG.4
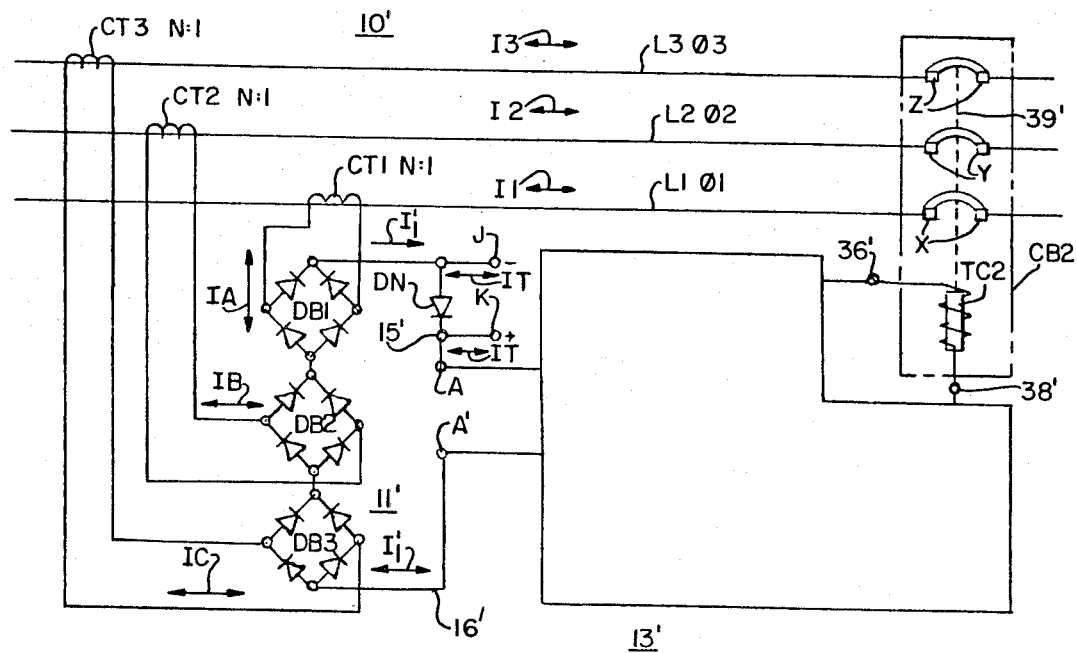

CIRCUIT BREAKER WITH DETACHABLY CONNECTED FAULT SIMULATOR

CROSS REFERENCES TO RELATED APPLICATIONS

This is a division of application Ser. No. 401,932 filed Sept. 28, 1973.

Cross reference is herein made to the copending applications of Alfred E. Maier et al., U.S. Ser. No. 327,961 now U.S. Pat. No. 3,808,567 issued Apr. 23, 1974; Alfred E. Maier, U.S. Ser. No. 327,961 now U.S. Pat. No. 3,808,567 issued Apr. 23, 1974; Alan B. Shimp, U.S. Ser. No. 327,973 now U.S. Pat. No. 3,818,275 issued June 18, 1974; and Alfred E. Maier, U.S. Ser. No. 327,972, all of which are assigned to the same assignee as in the present case and all of which were filed in the U.S. Patent Office on Jan. 30, 1973.

BACKGROUND OF THE INVENTION

1. Field of the Invention

This invention relates generally to apparatus for testing circuit breakers, and specifically, to apparatus and methods for testing molded case circuit breaker trip circuits by simulating fault signals at the input to the trip circuit.

2. Description of the Prior Art

In the past, circuit breakers have been tested periodically to insure that the solid state trip circuit therein is functioning correctly by passing a high current through each breaker pole in order to simulate the fault at the source. However, there are certain disadvantages with this operation. One disadvantage lies in the fact that the devices for simulating faults at the circuit breaker pole are relatively large and expensive. Further, it is required that the circuit breaker be disconnected from the line it had been protecting and reconnected to the device for providing the simulated fault current at the pole of the circuit breaker. This is inconvenient, time consuming and presents a potential safety hazard since a risk to personnel and equipment exists each time the poles of a circuit breaker are connected or disconnected from a potentially hot electrical conductor. It would be advantageous therefore to test the solid state trip circuit of a circuit breaker without having to physically manipulate the circuit breaker or the conductors connected thereto. It would also be advantageous to do this inexpensively and quickly with equipment of a relatively small volume and weight.

SUMMARY OF THE INVENTION

There is provided an improved means for testing circuit breakers of the molded case variety. Terminals are provided on the outer casing on the circuit breaker to be tested so that test lines may be provided to the circuit breaker. The circuit breaker need not be disconnected or physically moved from its location to test the solid state trip circuit contained herein because the previously described terminals provide the needed input terminals to the circuit breaker for accomplishing testing. A relatively small, lightweight fault simulator is provided which has a selector switch thereon and which can be energized by standard 120 volt 60 hz electrical current. Two leads from the simulator are connected to the previously described terminals of the circuit breaker. This connects the fault simulator to the trip circuit in series with the fault sensors normally associated with the trip circuit of the circuit breaker. By positioning one pole of a selector switch into either of two positions, either a relatively high level fault simulated signal may be provided to the trip circuit or a relatively low level fault simulated signal may be provided to the trip circuit. In the case of the high level fault, the trip circuit should trip almost instantaneously. In the case of the low level fault, the trip circuit should trip after a predetermined time delay which is related to the amount of overload. A feature of the simulator which is associated with the high level signal is a timing means for causing the high level signal to be removed from the input terminals of the trip circuit a relatively short time after it has been imposed thereupon. The reason for this is to protect the trip circuit from high current stress over a prolonged period. In normal operation, when a high level fault is sensed by the trip circuit, it causes the circuit breaker to trip almost instantaneously, thus removing the source of high level fault. The latter-mentioned feature of the simulator accomplished the same purpose.

BRIEF DESCRIPTION OF THE DRAWINGS

For a better understanding of the invention, reference may be had to the preferred embodiments exemplary of the invention shown in the accompanying drawings, in which:

FIG. 2 shows a schematic circuit diagram of one embodiment of the fault simulator;

FIG. 3 shows an electrical circuit which may be substituted for a portion of the circuit shown in FIG. 2 to thereby illustrate another embodiment of the invention; and FIG. 4 shows an electric circuit diagram of a circuit interrupter system which is shown partly in schematic form and partly in functional block diagram form.

DESCRIPTION OF THE PREFERRED EMBODIMENT

Figure 1:
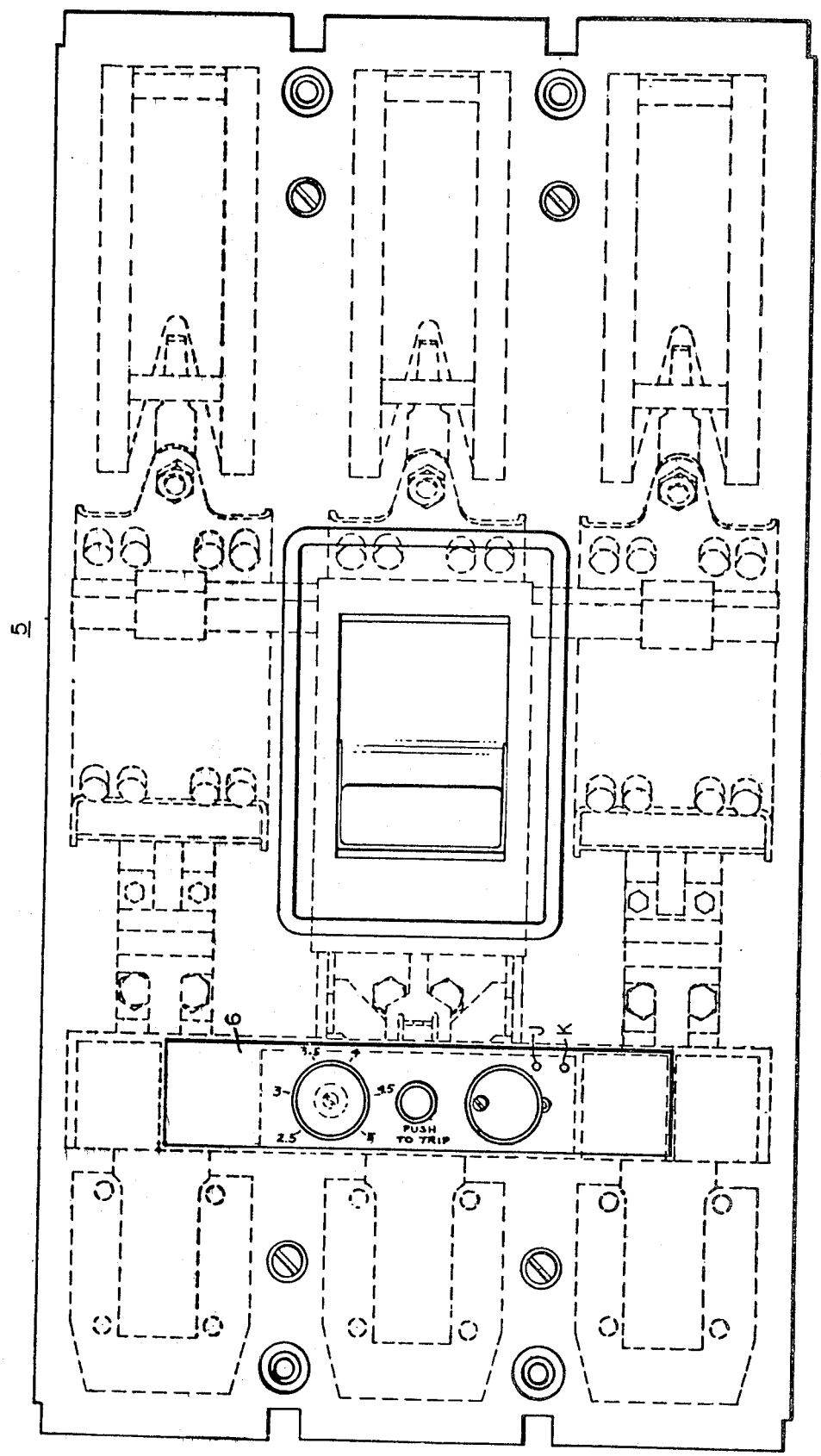
FIG. 1 shows a front view of a molded case circuit breaker where two terminals are provided for interconnecting the simulator and the circuit breaker.

Referring now to the drawings, and FIG. 1 in particular, a front view of a molded case circuit breaker 5 is shown. A detailed description of the construction and operation of circuit breaker 5 is given in previously described U.S. Pat. No. 3,826,951.

In the lower front panel of the circuit breaker 5 is disposed a static circuit board 6. In the upper right portion of static circuit board 6 are two terminals J and K. These terminals are provided for interconnecting the fault simulator which is the subject matter of the invention with the static trip circuitry of the circuit breaker 5. In the preferred embodiment of the invention, terminals J and K are bayonet or male electrically conducting terminals recessed within cylindrical openings. In the preferred embodiment of the invention, the fault simulator which is the subject of this invention and which is to be described hereafter is adapted for use primarily with circuit breaker 5. However, it is to be understood that the principles embodied in the teachings of the invention may be applied to other circuit breakers and are not limited to the circuit breaker 5 shown in FIG. 1.

Referring now to FIG. 2, one embodiment of the fault simulator is depicted. The fault simulator is generally designated F. It comprises a transformer TA, having a primary winding P and a secondary winding S. The input terminals of the primary winding P may be connected to any conventional source of power, such as, but not limited to, 120 volts 60 hz alternating current as in the preferred embodiment. The output terminals of the secondary winding S are connected across a full wave bridge rectifier network DBA. One of the output terminals of the bridge DBA comprises the system common and has connected thereto one terminal J' of the two output terminals of the fault simulator F. The other output terminal of the bridge DBA is connected to the pole of a switch S. Switch S has two contact positions LD and SD. Contact position LD is connected to a resistive element RA, the other end of which is connected to an output terminal K', which is the other of the two output terminals of the fault simulator F. The SD contact of the switch S is connected to one end of a resistive element RB and concurrently to one end of a resistive element RC. The other end of resistive element RC is connected to one end of capacitive element CA and one end of a relay coil CR1. The other ends of the capacitive element CA and coil CR1 are connected to bridge common terminal J'. The other end of resistive element RB is connected to the normally closed contacts KCR1 of the relay represented by relay coil CR1. The other end of the normally closed contact KCR1 is connected to the anode of a diode DA, the cathode of which is connected to the previously mentioned terminal K'. In operation, the primary winding P of the transformer TA is energized by a suitable power source such as the previously mentioned 120 volts 60 hz alternating current source. This energy is carried through transformer TA to the secondary winding S thereof. From there it is rectified by the full wave bridge rectifier DBA. If the pole of the switch S is in the LD position, the output current from the bridge DBA is supplied through resistive element RA to the K' contact, from whence it flows into a load which may be connected between the K' contact and the J' contact, and from that load into the J' contact and to a return path to the other end of the bridge rectifier network DBA. The resistive element RA may be used for calibration purposes to determine the magnitude of the current flowing into and out of the contacts K' and J', respectively. If the pole of switch S is in the other or SD contact position, portions of current from the positive output terminal of the bridge DBA flow concurrently through resistive elements RC and RB, the amount of current flowing through each being dependent upon the loads of each of the networks containing the two previously described elements. Electrical current will flow through resistive element RB, through the normally closed contacts KCR1, through the diode DA, into the contact or terminal K'. It will then circulate through an external load which may be connected to the fault simulator F and thence into the terminal J' and back to the bridge DBA. Concurrent with this, electrical current flows through the resistive element RC to charge the capacitive element CA. The capacitive element will charge to a predetermined voltage value which is dependent upon the magnitude of the current flowing through the resistive element RC. The time constant of the network includes the resistive element RC, the capacitive element CA, and the resistance and inductance of relay coil CR1. After a predetermined period of time, capacitive element CA will charge to a voltage value sufficient to energize relay coil CR1 which will then cause normally closed relay contacts KCR1 to open. When the contacts KCR1 open, that path including the resistive element RB, diode DA and the load connected across the terminals K', J' is interrupted, and consequently, no more current flows through the load. As a result, the SD setting or contact position for the switch S, represents a short delayed application of simulated fault current to any load which may be connected between the terminals K' and J'. However, if the pole of switch S is in the LD contact position, current will flow through the previously described load until the pole of the switch S is moved to another position, the load is disconnected or the input terminals of the primary winding T of the transformer TA are deenergized.

In a primary embodiment of the invention, the terminals K', J' match or are complementary to the terminals K, J shown in FIG. 1. In a preferred embodiment of the invention, terminals K', J' are in a female plug which is complementary to the recessed bayonet male contacts shown at K and J in FIG. 1.

Referring now to FIG. 3, another embodiment of the invention shown. In this embodiment of the invention, the capacitive timing circuit, including resistive element RC, capacitive element CA and relay coil CR1, is deleted, as the timing function is provided by other means. In this embodiment of the invention, a resistive element RD is connected to the terminal SD. The other end of resistive element RD is connected to a lamp LA. The other terminal of the lamp LA is connected to the anode of a diode DD, the cathode of which is connected to the previously described output terminal K'. In this embodiment of the invention, when the pole of the switch S is put in the SD contact position, current will flow through the resistive element RD and through the lamp LA, the diode DD' and out of the terminal K' in a manner similar to that previously described with respect to FIG. 2. As the element of the lamp LA increases in temperature, the resistance thereof increases correspondingly. This increase of resistance causes an increase in the overall resistance of the path, and thus, tends to limit the current flowing therethrough. Although the current is not completely turned off, as with the opening of the contacts KCR1 of FIG. 2, the current may be sufficiently limited to prevent significant flow in any load which may be connected between the terminals K' and J', shown in FIG. 2.

Referring now to FIG. 4, there is shown a schematic diagram of solid state circuitry, which is more specifically described in detail in the previously mentioned U.S. Pat. Nos. 3,818,275 and 3,826,951. The schematic diagram is that of a circuit breaker system 10', where the circuit breaker is designated CB2 and has therein at least one set of separable main contacts which are adapted to open and close to protect an electrical conductor. Conductors L1 through L3 are examples of such a conductor. There is opening means operable for actuating the contacts to the open position. The opening means includes a trip coil TC2 having a movable plunger attached to a linkage 39' which interlinks and moves the separable main contacts XX, YY and ZZ on the lines L1, L2 and L3, respectively. The later mentioned lines may be electrical conductors for a three-phase electrical system having phases $\phi 1$, $\phi 2$, and $\phi 3$, respectively, in which are flowing electrical currents I1, I2, and I3, respectively. Interconnected with the opening means TC2 is a trip circuit, generally designated 13' in FIG. 4, it being understood that any trip circuit may be used provided it can actuate the opening means TC2 and may be energized by the means which will be described hereinafter. In this embodiment of the invention, the trip circuit 13' comprises a substantially entirely solid state trip circuit. Monitors CT1, CT2 and CT3 are disposed to monitor the currents I1, I2 and I3, respectively, flowing in the lines L1, L2, and L3, respectively. In this embodiment of the invention, monitors CT1, CT2 and CT3 are N to 1 current transformers. However, it is to be understood that any convenient monitoring means may be used provided it satisfies the input conditions of the bridge network. The output of the current transformer CT1 is connected to the input of a full wave bridge rectifier DB1. The output of the current transformer CT2 is connected to the input of a full wave bridge rectifier DB2, and the output of the current transformer CT3 is connected to the input to a full wave bridge rectifier DB3. The output terminals of the full wave bridge rectifiers DB1 through DB3 are interconnected in series circuit relationship. Also connected in series circuit relationship therewith is a diode DN, on either side of which are provided the two previously described terminals J and K which are also shown in FIG. 1. It is at this convenient place that the simulator F shown in FIGS. 2 and 3 may be interconnected with the solid state trip circuitry 13' of FIG. 4 in a series circuit relationship. The diode DN represents a diode connected in reversed-biased relationship across the output terminals K', J' of the previously described fault sensor F. This means that the positive terminal K and the negative terminal J are isolated by the reverse-biased diode DN. Current provided by the fault sensor F flows into line 15' through the remaining portions of the static or solid state trip circuit 13' through the system common of the latter named circuit into line 16' and back through the series combination of the full wave bridge rectifiers DB1 and DB3 and finally into terminal J, where it is returned to the fault simulator F. It can therefore be seen that any current provided by the fault simulator F is supplemental to the current I1, shown flowing in lines 15' and 16' of FIG. 4, which current is generated by the series combination of the full wave bridge rectifiers DB1 through DB3 in response to currents sensed in lines L1 through L3 respectively by current transformers. These current transformers need not be disconnected, nor the circuitry associated therewith rearranged for simulating a fault in the solid state trip circuitry 13' once the diode DN has been placed in the circuitry and the terminals J and K made available. It is at this convenient place, terminals J and K, that the simulator F shown in FIGS. 2 and 3 may be connected. During normal operation when the breaker is not being tested, the current $I_1''$ flowing into the solid state circuit is equal to the highest of the three current transformer output currents $I_A$, $I_B$ or $I_C$ at any instant of time because of the series connection of bridge rectifiers DB1, DB2, and DB3. This connection of bridge rectifiers to provide current auctioneering is described by J. C. Engel et al. in U.S. Pat. No. 3,689,801. During normal operation diode DN is forward biased by the current $I_T$.

When a test current $I_t$, greater than any of the currents $I_A$, $I_B$, or $I_C$, is applied to terminals J and K with the polarity shown in FIG. 4, diode DN is reversed biased and the current $I_4$ is equal to $I_T$. The solid state trip circuitry, 13', then responds only to the test current $I_T$ and is independent of currents $I_A$, $I_B$, and $I_C$ which are generated by the series combination of the full wave bridge rectifiers DB1 through DB3 in response to currents sensed in lines L1 through L3 respectively by current transformers CT1, CT2, and CT3. This also means that the circuit breaker portion CB2 which in the preferred embodiment may be a portion of circuit breaker 5 shown in FIG. 1 need not be disconnected for testing.

The input terminals to the solid state trip circuit 13' are shown at A, A' and the output terminals are shown at 36' and 38'. It is across these latter mentioned output terminals that the trip coil TC2 is connected. In normal operation, should a fault be sensed in any of the lines L1 through L3, the following sequence of events will take place. That current transformer CT1 through CT3 which senses or monitors a fault current I1 through I3, respectively in any or all of the lines to be protected will provide a current signal to its respective bridge network DB1 through DB3. The current I1' is proportional to the magnitude of the largest current in any of the lines L1 through L3. This current is fed through to the solid state trip circuit 13' where it is electrically interpreted by circuit elements therein to determine at which point in time an output signal will be impressed across the output terminals 36' and 38' to energize the trip coil TC2 to cause an opening of the separable main contacts XX, YY and ZZ to interrupt the flow of current in the lines or line to be protected. Normally, the testing of the circuit breaker system 10 would require disconnecting of the circuit breaker CB2 and the subsequent generation of overload currents I1, I2 and/or I3 in lines L1, L2 and/or L3 to generate the current I1' sufficient to cause the trip circuit 13' to actuate the trip coil TC2 to cause the disconnected circuit breaker CB2 to be tested. According to the teachings of the preferred embodiment of the invention, however, the placement of the fault simulator F at the output of the circuit which includes the three bridge networks DB1 through DB3 eliminates the necessity for providing a fault current in the lines L1 through L3. That current may be simulated by the currents flowing out of terminal K' and into terminal J' of the fault simulators F. This later current may be calibrated to simulate current I1', which current, as was previously described, is related to the amount of overload current flowing in any of the lines to be protected. The current flowing between terminals K' and J' of the fault simulator F is supplied to the solid state trip circuit 13' whereupon it causes that circuit to react according to the magnitude of the current. Relatively high fault currents may be simulated by displacing the wiper of the switch S of the fault sensor F to the SD position where a relatively large electrical current is provided to the sensor 13' for a predetermined time, depending upon the timing characteristics previously described with respect to FIGS. 2 and 3. The relatively high current will cause an almost instantaneous trip of the circuit breaker CB2, whereafter the current is removed as was previously described. Relatively lower magnitudes of current may be provided by displacing the pole of switch S to the LD position, where the removal of current in the solid state trip circuit 13' between the terminals K and J is not automatic. The currents provided to the trip circuit 13' in this case may be similar to the kinds of current which normally cause delayed opening of circuit breaker contacts because of the relative low level thereof.

A method of using the fault sensor F includes connecting the output terminals K', J' thereof to the input terminals K, J of the circuit breaker to be tested and then energizing the fault sensor by connecting the primary P of the transformer TA to a suitable source of power. Then, depending upon the setting of the switch, current may flow into the trip circuit at a relatively high magnitude for a short period of time or at a relatively low magnitude indefinitely.

It is to be understood that the circuit breaker system 10' of FIG. 4 is only exemplary of the workings of the invention taught herein and any similar circuit breaker system including a single phase system may be utilized. It is also to be understood that the internal elements and connections of the solid trip circuit 13' are relatively unimportant, provided they can be adjusted to react to the flow of current provided by the fault sensor F to cause a tripping of the circuit breaker CB2.

The teachings of this invention have many advantages. One of the advantages lie in the fact that a circuit breaker trip system such as shown in FIG. 4 may be tested without the necessity of disconnecting and reconnecting large portions of the circuit breaker system associated therewith. Another advantage lies in the fact that the apparatus and manner of testing the circuit breaker trip system provides for increased safety. Another advantage lies in the fact that the apparatus for simulating a fault signal, such as F shown in FIGS. 2 and 3, is relatively inexpensive, lightweight and portable. Another advantage lies in the fact that the fault sensor may be calibrated or adjusted to provide currents over a wide range of current values. Another advantage lies in the fact that relatively high level simulating currents may be provided by the apparatus F shown in FIG. 2 for a relatively short period of time, therefore simulating a short circuit on the line to be protected without stressing the elements of the solid state trip circuit for long periods of high currents and high voltage.

What we claim as our invention is:

1. Circuit breaker apparatus, comprising;
   A. separable main contacts operable to open and close on an electrical conductor to be protected thereby;
   B. opening means operable for actuating said contacts to the open position;
   C. a trip circuit interconnected with said opening means for causing operation thereof;
   D. sensor means interconnected with said trip circuit and disposed to monitor the electrical current in said electrical conductor, said sensor means providing a signal to said trip circuit when said current in said conductor attains a predetermined value, said trip circuit causing the opening of said main contacts after a predetermined period of time which time is related to the amount of said electrical current in said conductor as monitored by said sensor;
   E. an insulating housing; and
   F. terminals disposed on said insulating housing and connected to said trip circuit, said terminals being detachably connected to an external fault simulator for providing a first simulating signal to said trip circuit at any desired time and regardless of the value of the current flowing through said conductor, said latter signal simulating said signal from said sensor when said value of current flowing in said conductor is substantially larger than said predetermined value, and for providing a second simulating signal to said trip circuit at any desired time and regardless of the value of current flowing in said conductor, said latter signal simulating said signal from said sensor when said value of current flowing in said conductor is larger but not substantially larger than said predetermined value.

2. Circuit breaker apparatus, comprising:
   A. a circuit breaker having separable main contacts operable to open and close on an electrical conductor to be protected thereby, opening means operable for actuating said contacts to the open position;
   B. a trip circuit interconnected with said opening means for causing operation thereof;
   C. sensor means interconnected with said trip circuit and disposed to monitor the electrical current in said electrical conductor, said sensor means providing a signal of said trip circuit when said current in said conductor attains a predetermined value, said trip circuit causing the opening of said main contacts after a predetermined period of time which time is related to the amount of said electrical current in said conductor as monitored by said sensor;
   D. an insulating housing;
   E. terminal means disposed on said insulating housing and connected to said trip circuit means;
   F. a fault simulator detachably interconnected with said terminal means, comprising:
      1. first means additional to said sensor means actuable for providing a first simulating signal to said trip circuit at any desired time and regardless of the value of the current flowing through said conductor, said latter signal simulating said signal from said sensor when said value of current flowing in said conductor is substantially larger than said predetermined value;
      2. second means additional to said sensor means actuable for providing a second simulating signal to said trip circuit at any desired time and regardless of the value of current flowing in said conductor, said latter signal simulating said signal from said sensor when said value of current flowing in said conductor is larger but not substantially larger than said predetermined value; and
      3. third means for interconnecting said first and second means with said trip circuits.

3. The combination as claimed in claim 2 comprising a fourth means for selectively choosing which of either said first simulating means or said second simulating means is provided to said trip circuit.

4. The combination as claimed in claim 2 wherein said trip circuit comprises a solid state trip circuit.

5. The combination as claimed in claim 2 wherein said circuit breaker comprises separable main contacts which are actuable to the open condition to protect said conductor.

6. The combination as claimed in claim 2 wherein said first simulating signal and said second simulating signal are electrical signals.

7. The combination as claimed in claim 2 wherein said first means comprises means for removing said first simulating signal from said trip circuit a predetermined time after the application thereof which time is related to the capability of said trip circuit to be exposed to said first simulating signal without being damaged to the state of inoperability for the intended purpose thereof.

8. The combination as claimed in claim 2, wherein said first means comprises:
   A. a source of electrical current; and
   B. a temperature sensitive first resistive means which has the characteristic of increasing in resistance value as the temperature therein increases due to the continued flow of electrical current therethrough, said first resistive means interconnecting said source of current and said trip circuit to supply said first simulating signal in the form of electrical current from said source of current when said simulator is actuated for that purpose, said current being limited a predetermined time thereafter to thereby substantially limit the flow of current therethrough in response to the rise of temperature therein to essentially prevent said simulating signal from further substantially energizing said trip circuit.

9. The combination as claimed in claim 2 wherein said first means comprises:
A. a source of direct electrical current;
B. first resistive means;
C. first capacitive means, said first resistive means and said capacitive means being interconnected in electrical circuit relationships to form a charging network for charging said capacitive means with a portion of said electrical current from said source of electrical current to a predetermined voltage value during a predetermined period of time;
D. voltage sensitive relay means having movable relay contacts, said relay means having movable relay contacts, said relay means being connected in circuit relationship with said capacitive means and energized by the voltage level across said capacitive means to open and close said movable relay contacts; and
E. electrical interconnecting means comprising said movable relay contacts interconnected between said source of electrical current and said trip circuit to supply said first simulating signal in the form of the remaining portion of electrical current from said source of current to said trip circuit when said simulator is actuated for that purpose, said relay contacts opening and thus preventing further application of said simulating signal to said trip circuit when said capacitive means has been charged to said predetermined voltage value.

* * * * *